United States Patent
Kephart (10) Patent No.: US 12,332,888 B2
(45) Date of Patent: Jun. 17, 2025

(54) SYSTEM FOR STORING AND RETRIEVING QUERIES BY CONTENT

(71) Applicant: International Business Machines Corporation, Armonk, NY (US)

(72) Inventor: Jeffrey Owen Kephart, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/191,125

(22) Filed: Mar. 28, 2023

(65) Prior Publication Data

US 2024/0330288 A1   Oct. 3, 2024

(51) Int. Cl.
G06F 16/2453 (2019.01)
G06F 16/2455 (2019.01)
G06F 16/248 (2019.01)

(52) U.S. Cl.
CPC .... G06F 16/24542 (2019.01); G06F 16/2455 (2019.01); G06F 16/248 (2019.01)

(58) Field of Classification Search
CPC ........... G06F 16/24542; G06F 16/2455; G06F 16/248
USPC .......................................................... 707/718
See application file for complete search history.

(56) References Cited

U.S. PATENT DOCUMENTS

| 10,621,166 | B2 | 4/2020 | Mittal et al. |
| 10,795,886 | B1 | 10/2020 | Samdani et al. |
| 10,885,113 | B2 | 1/2021 | Wahl et al. |
| 2014/0317140 | A1* | 10/2014 | Rash ................. G06F 16/24553 707/776 |
| 2017/0371902 | A1* | 12/2017 | Zellweger ........... G06F 16/2282 |
| 2021/0334300 | A1* | 10/2021 | Banda ..................... G06N 3/08 |

OTHER PUBLICATIONS

"Manage queries (Power Query)", https://support.microsoft.com/en-us/office/manage-queries-power-query-76f93a6d-37d9-46b5-bc40-d5f2162401f5, Microsoft, (Retrieved: Mar. 14, 2023), 3 pages.
"Reusing report queries in data sets", https://www.ibm.com/docs/en/cognos-analytics/11.1.0?topic=ds-reusing-report-queries-in-data-sets, IBM Documentation, (Retrieved: Feb. 7, 2023), 2 pages.
Anonymous, "Contextual Feature Generation Using Meta Learning for Automated Machine Learning," IPCOM000264361D, IP.com, Dec. 7, 2020, 6 pages.
Anonymous, "Method and System for Contextual Dwell-Time Aware Query toAdvertisement Matching With Explicit Negative Feedback," IPCOM000256970D, IP.com, Jan. 10, 2019, 7 pages.

(Continued)

*Primary Examiner* — Joshua Bullock
(74) *Attorney, Agent, or Firm* — Cantor Colburn LLP; Robert D. Bean (57) ABSTRACT

Computer-implemented methods for a system for storing and retrieving queries by content. Aspects include receiving data associated with a search query. Aspects further include generating a query table by executing a metaquery using the data on query metadata attributes of existing search queries. The query table can include information for a group of search queries of the existing search queries. Aspects also include generating search results by executing a selected query chosen from the query table and displaying the search results from the execution of the selected query.

22 Claims, 4 Drawing Sheets

(56) References Cited

OTHER PUBLICATIONS

Anonymous, "System and method for Video, Audio, Text Clues based Cognitive Metadata Enrichment Platform," IPCOM000263152D, IP.com, Aug. 2, 2020, 5 pages.
Anonymous, "Using Metadata to Improve Query Autocompletion Suggestions," IPCOM000260610D, IP.com, Dec. 11, 2019, 4 pages.
Musale, et al., "Retrieving Content Based Documents by using Image Processing and NLP Through Query," International Journal of Creative Research Thoughts (IJCRT), vol. 9, 2021, 6 pages.
Saritha, et al., "Content based image retrieval using deep learning process," Cluster Computing, 2018, 17 pages.
Singhania, et al., "Text-Based Image Retrieval Using Deep Learning," Vellore Institute of Technology, India, 2020, 4 pages.
Yenala, et al., "Deep learning for detecting inappropriate content in text," International Journal of Data Science and Analytics, 2017, 14 pages.
Zivkovic, "SQL Server Query Store—Overview" https://www.sqlshack.com/sql-server-query-store-overview/, (Retrieved: Mar. 14, 2023), 13 pages.

\* cited by examiner

SYSTEM FOR STORING AND RETRIEVING QUERIES BY CONTENT

BACKGROUND

The present invention generally relates to search queries, and more specifically, to computer systems, computer-implemented methods, and computer program products for storing and retrieving queries by content.

Software applications that entail storing and retrieving data can provide a way for users to create and store their own search queries to use in the future. To help distinguish among stored search queries, some query creation tools permit users to label or name newly defined search queries.

When the user wants to execute a previously saved search query, they can retrieve the search query by searching for the name or label it was previously associated with and execute the retrieved search query. Typically, retrieving and executing a search query by its name or label requires a user to review a list of queries by name and select the desired search query (e.g., clicking on its visual representation and clicking a button) to execute the search query.

Although software applications enable users to create and store their own search queries, searching for a specific search query can be problematic. If the user does not remember the name or label that they associated with the search query, they must do a linear search through all the saved queries to find the one they saved. Additionally, if multiple users contribute to the same pool of stored search queries, the names established by one user may not be meaningful to other users, which makes locating the correct search query difficult.

SUMMARY

Embodiments of the present invention are directed to a computer-implemented method for storing and retrieving queries by content. According to an aspect, a computer-implemented method includes receiving data associated with a search query. The method also includes generating a query table by executing a metaquery using the data on query metadata attributes of existing search queries. The query table includes information for a group of search queries of the existing search queries. The method further includes generating search results by executing a selected query from the query table. The method also includes displaying the search results from the execution of the selected query. Executing a metaquery using the data on query metadata attributes enables a user to identify relevant search queries based on their content and related information, rather than an arbitrary label or name that does not accurately reflect the contents of a search query.

In one embodiment of the present invention, the method includes updating query metadata attributes of the selected query selected using the search results from executing the selected query. Updating the query metadata attributes enables users to identify search queries based on the latest updates to the pertinent search query.

In one embodiment of the present invention, the method includes receiving an indication to save a created search query. The method further includes generating query metadata attributes for the created search query. The method also includes associating the query metadata attributes with the created search query. The method includes storing the created search query and the query metadata attributes of the created search query. Generating and associated query metadata attributes when a search query is created enables a user to quickly locate the search query based on the contents of the search query.

In one embodiment of the present invention, the query metadata attributes further include intrinsic query metadata and extrinsic query metadata of a search query. The intrinsic query metadata includes, for example, but are not limited to, a query attribute name, a query attribute value, or a query attribute type. The extrinsic query metadata includes, for example, but are not limited to, a number of executions of the search query, a creation date of the search query, a last date of execution of the search query, an average number of records retrieved by the search query, a list of salient words associated with the search query, or a list of distinctive words associated with the search query. Deriving metadata that is both intrinsic and extrinsic to the search query enables a user to execute a metaquery to locate a search query with more precision and flexibility.

In one embodiment of the present invention, the method includes receiving an indication to modify an identified search query. The method also includes modifying an attribute of the identified search query. The method further includes updating query metadata attributes of the identified search query in response to modifying the identified search query. The method also includes storing the identified search query and query metadata attributes of the identified search query. Enabling a user to modify or augment the query metadata attributes associated with the search query permits a user to further personalize or customize the search query.

According to another non-limiting embodiment of the invention, a system having a memory having computer readable instructions and one or more processors for executing the computer readable instructions, the computer readable instructions controlling the one or more processors to perform operations. The operations include receiving data associated with a search query. The operations also include generating a query table by executing a metaquery using the data on query metadata attributes of existing search queries. The query table includes information for a group of search queries of the existing search queries. The operations further include generating search results by executing a selected query from the query table. The operations also include displaying the search results from the execution of the selected query. Executing a metaquery using the data on query metadata attributes enables a user to identify relevant search queries based on their content and related information, rather than an arbitrary label or name that does not accurately reflect the contents of a search query.

According to another non-limiting embodiment of the invention, a computer program product for adaptive, personalized system for managing training compliance is provided. The computer program product includes a computer-readable storage medium having program instructions embodied therewith, the program instructions executable by a processor to cause the processor to perform operations. The operations include receiving data associated with a search query. The operations also include generating a query table by executing a metaquery using the data on query metadata attributes of existing search queries. The query table includes information for a group of search queries of the existing search queries. The operations further include generating search results by executing a selected query from the query table. The operations also include displaying the search results from the execution of the selected query. Executing a metaquery using the data on query metadata attributes enables a user to identify relevant search queries based on their content and related information, rather than an arbitrary label or name that does not accurately reflect the contents of a search query.

According to another non-limiting embodiment of the invention, a computer-implemented method includes receiving a request comprising data associated with a search query. The method also includes executing a metaquery using the data on query metadata attributes of search existing queries to generate a query table of search queries. The method further includes executing a selected search query from the query table to generate query search results. The method also includes displaying the query search results. The method includes updating query metadata attributes of the selected search query using the query search results. Executing a metaquery using the data on query metadata attributes enables a user to identify relevant search queries based on their content and related information, rather than an arbitrary label or name that does not accurately reflect the contents of a search query.

In one embodiment of the present invention, the method includes receiving a request to modify the selected search query. The method includes modifying an attribute of the selected search query. The method further includes updating query metadata attributes of the selected search query in response to modifying the selected search query. The method further includes storing the selected search query and query metadata attributes of the selected search query. The method enables the user to modify an existing search query without having to recreate a query, increasing efficiencies for the user.

In one embodiment of the present invention, the method includes receiving an indication to clone the selected search query. The method further includes generating a cloned search query and query metadata attributes based on the selected search query. The method includes storing the cloned search query and the query metadata attributes of the cloned search query. The method enables the user to copy or cline an existing search query without having to recreate a search query.

According to another non-limiting embodiment of the invention, a system having a memory having computer readable instructions and one or more processors for executing the computer readable instructions, the computer readable instructions controlling the one or more processors to perform operations. The operations include receiving a request comprising data associated with a search query. The operations include executing a metaquery using the data on query metadata attributes of search existing queries to generate a query table of search queries. The operations further include executing a selected search query from the query table to generate query search results. The operations also include displaying the query search results. The operations further include updating query metadata attributes of the selected search query using the query search results.

In one embodiment of the present invention, the operations further include receiving a request to modify the selected search query. The operations include modifying an attribute of the selected search query. The operations also include updating query metadata attributes of the selected search query in response to modifying the selected search query. The operations include storing the selected search query and query metadata attributes of the selected search query. The system enables the user to modify an existing search query without having to recreate a query, increasing efficiencies for the user.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

Disclosed herein are methods, systems, and computer program products for storing and retrieving queries by content. Users can readily find stored search queries by content or metadata related to the stored search query by treating search queries as data and retrieving them by performing a metaquery or a query on the generated query metadata attributes associated with the search queries. Upon creating a search query, the systems and methods described herein generate query metadata attributes that are related to the search query and store the query metadata attributes in association with the search query. Whenever the search query is modified or executed or a specific request to modify the query metadata attributes is made, the systems and methods described herein are able to update the query metadata attributes accordingly. Executing a metaquery enables a user to search the metadata associated with stored search queries to locate one or more potentially relevant search queries.

In addition to the content of the search queries, the systems and methods described herein enable retrieval of search queries by searching on the metadata of the search queries. For example, when a search query is to be retrieved, the user is able to search for the query through a sequence of one or more metaqueries on the query metadata attributes of stored search queries. At each step in the sequence of metaqueries, a current set of search queries matching the metaquery are displayed to the user in a table. The user can either locate the desired search query from the table or issue a further incremental metaquery to further narrow or expand the choices.

Although the systems and methods described herein are characterized in the context of data retrieval from structured databases, the inventive steps can be applied to many different scenarios where data retrieval is applied. For example, the systems and methods described herein can be applied to searches using web browsers. Many internet browsers store histories of visited URLs or searches that a user has conducted. By extracting search metadata from such searches, browsers can support metaqueries as described herein. For instance, a web browser can respond to metaquery requests from the user, such as "show searches about used cars from last week"; "show searches about cat videos that I've viewed most frequently this year"; or "show me all searches I've made on [auction site] for antique vases."

Additionally, the query metadata attributes generated by web browsers can be used by users to organize their searches into categories or folders, thereby further facilitating retrieving past web searches by query metadata attributes, which can be much more efficient than the current practice of scanning back through the browser history.

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
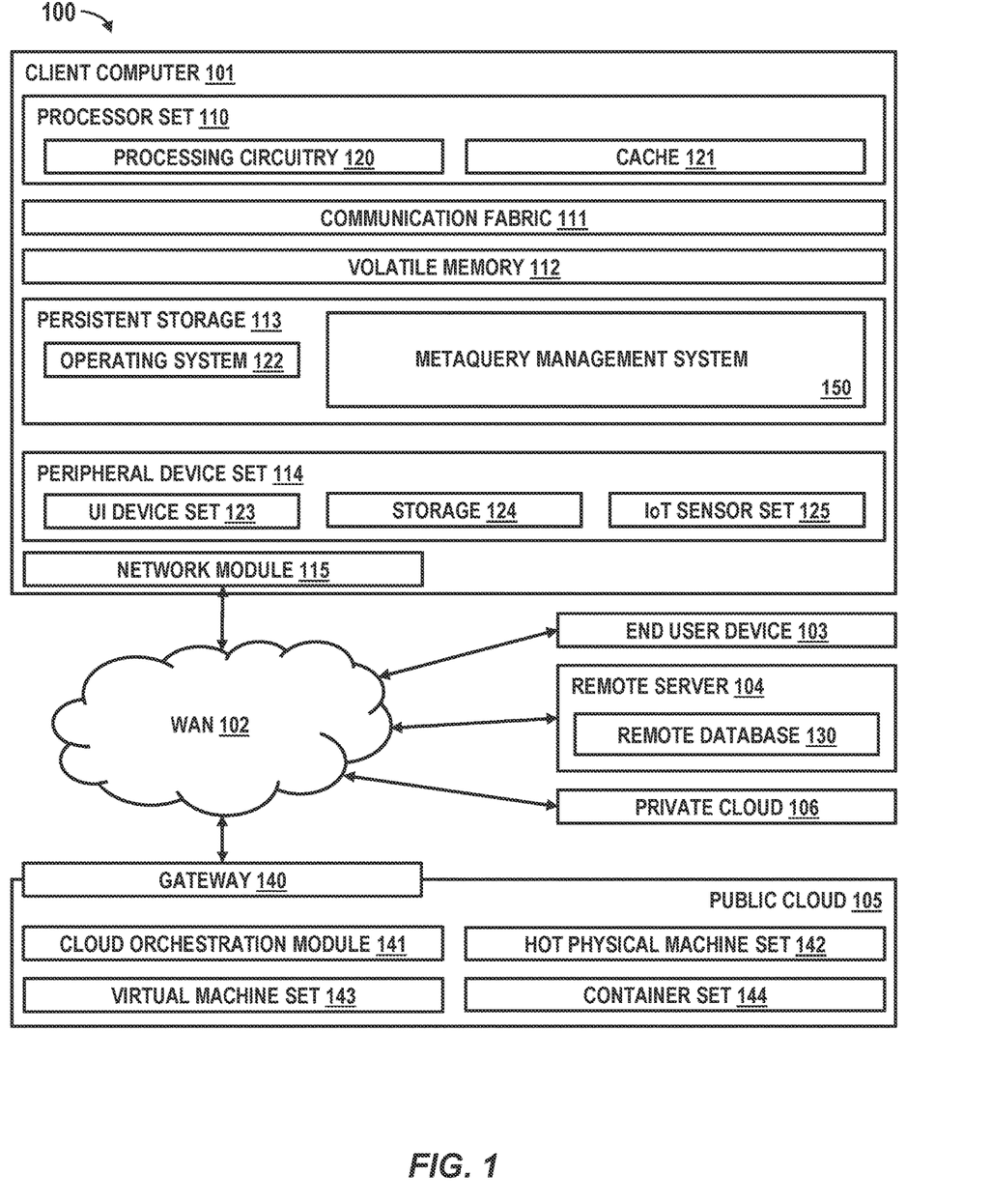
FIG. 1 depicts a block diagram of an example computer system for use in conjunction with one or more embodiments of the present invention.

Referring now to FIG. 1, computing environment 100 contains an example of an environment for the execution of at least some of the computer code involved in performing the inventive methods, such as a metaquery management system 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Client computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collects and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
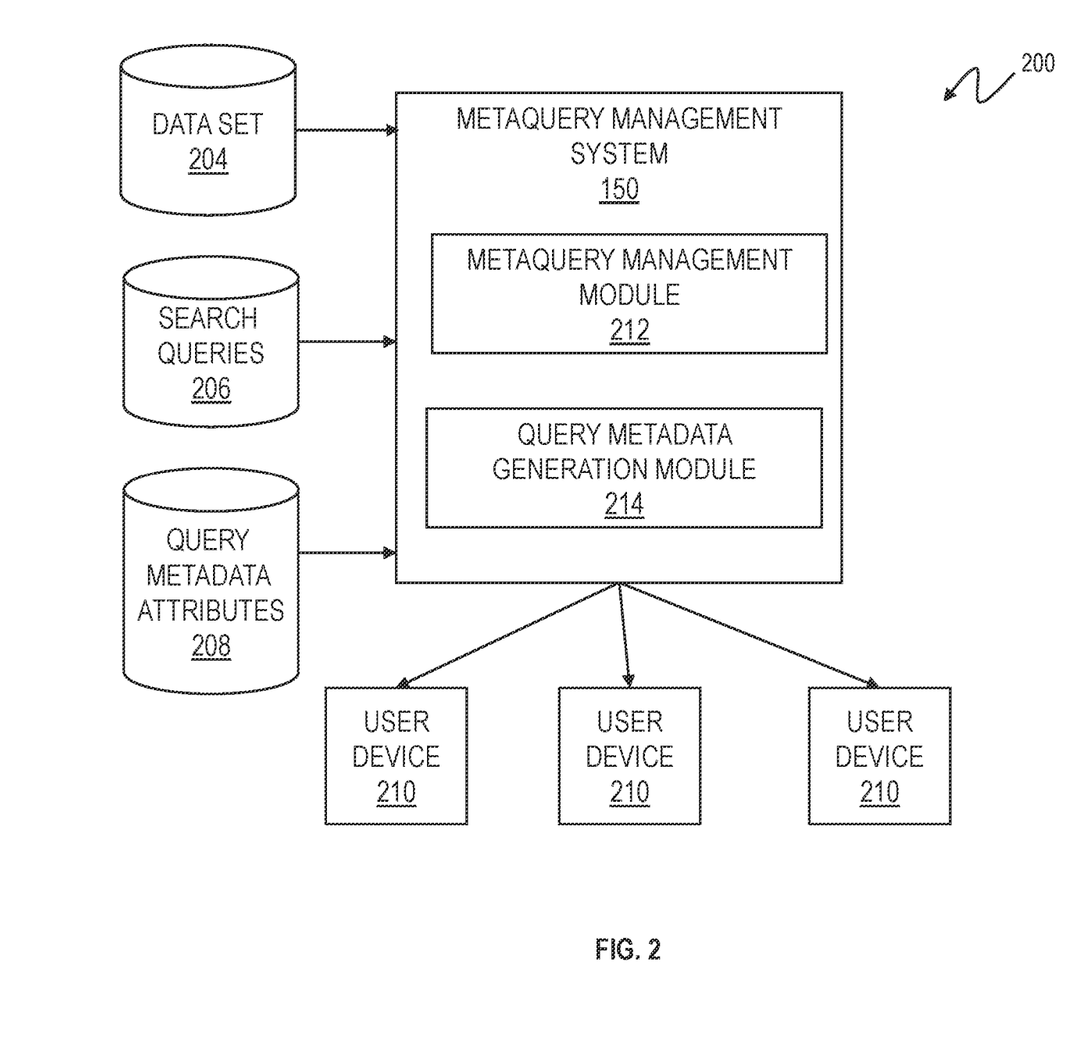
FIG. 2 is a block diagram of a system for storing and retrieving queries by content in accordance with one or more embodiments of the present invention.

Referring now to FIG. 2, a system 200 for storing and retrieving search queries by content in accordance with one or more embodiments of the present invention is shown. In exemplary embodiments, the system 200 includes a metaquery management system 150 that may be embodied in a computer 101, such as the one shown in FIG. 1. As illustrated, the system 200 includes a metaquery management system 150 that is configured to generate, update and/or retrieve search queries using query metadata attributes associated with search queries.

In exemplary embodiments, the metaquery management module 212 of the metaquery management system 150 enables a user to create search queries 206 using a user device 210. The search query 206 can be executed on one or more data sets 204. Search queries 206 can be premeditated query creations (e.g., where a user creates a search query 206 with the intent to use it in the future) or reactive query creations (e.g., where a user decides to save a search query 206 after it has been composed and executed).

For example, for a premeditated query creation, the metaquery management module 212 facilitates a user to create search queries 206 using different types of query creation tools, such as special-purpose graphical user interfaces or text boxes into which a user types a query or part of a search query in a specified languages, such as SQL. A search query 206 consists of a collection of query clauses which may each contain an attribute with one or more associated operators and attributes values.

The metaquery management module 212 receives an indication from the user device 210 to store the created search query 206. In some embodiments, the user indicates that they are finished composing the search query 206 by clicking on a button in the user interface displayed on the user device 210. The metaquery management module 212 communicates with the query metadata generation module 214 upon receiving the indication from the user device 210.

The query metadata generation module 214 generates query metadata attributes 208 associated with or derived from the search query 206. The query metadata attributes 208 are based on the contents of the search query 206 and other system properties, such as the current date and time.

In some embodiments, the metaquery management module 212 can prompt a user to provide additional metadata or override descriptive metadata that was derived by the query metadata generation module 214. In response to receiving an indication from the user device 210 that the user is finished augmenting or editing the query metadata attributes 208 associated with the search query 206, the metaquery management module 212 associates and stores the query metadata attributes 208 with the search query 206. In some embodiments, the metaquery management module 212 generates a link to the search query 206 and stores the link with the query metadata attributes 208.

In another example, a user may realize after experimenting with different search queries 206 that a particular one is worth saving for use in the future, which results in a reactive query creation. The metaquery management module 212 receives an indication from a user device 210 that an already-created search query 206 is to be saved. In some embodiments, the user indicates they wish to save the search query 206 by clicking a button on the user interface displayed on the user device 210. In some embodiments, a user can say or type a specific command via the user interface, such as "please store this query" which is interpreted to mean the search query 206 created most recently. If multiple search queries 206 have been created nearly contemporaneously, the user can select the search query 206 via the user interface using a mouse or other pointing device and specify that the search query 206 selected should be stored.

Upon receiving the indication to store the created search query 206, the metaquery management module 212 proceeds similarly to the premeditated query creations. That is, the metaquery management module 212 communicates with the query metadata generation module 214 to generate query metadata attributes 208 based on the contents of the search query 206 and other system properties, prompts the user to provide additional metadata or override descriptive metadata that were derived by the query metadata generation module 214, and stores the query metadata attributes 208 with a link to its associated search query 206 when the user indicates that they are finished augmenting or editing the query metadata attributes 208 for the search query 206 to be stored.

In some embodiments, the query metadata attributes 208 can include intrinsic query metadata and extrinsic query metadata. Intrinsic query metadata are based on the intrinsic properties of the search query 206, such as shown in Table 1. Other embodiments can contain different sets of metadata attributes, such as subsets and/or supersets of those displayed in Table 1. Intrinsic properties are attributes or information that can be readily derived from the search query 206 and other aspects of the user's interaction with the system 150 with relatively little elicitation of additional input from the user. For example, an intrinsic query metadata can include one or more "Attributes" or "Attribute Values" from the search query 206, "Owner" (e.g., creator) of the search query 206, and the like. Retrieval of the search queries 206 can be done by executing a metaquery search using such attributes.

TABLE 1

Examples of Intrinsic Properties of Search Queries

| Query Metadata Attribute | Type | Description |
|---|---|---|
| QueryID | String | Unique alphanumeric query identifier generated when it is created |
| Table | String | Name of data table on which query is executed |
| Query | Object | Structured representation of the query; preferred embodiment is JSON format used by MongoDB, i.e. {attribute1: {operator1: attribute Value1}, . . . , attributeN: {operatorN: attribute ValueN}} |
| Label | String | Descriptive label for query, for convenience |
| Description | String | More detailed description of query, for convenience |
| QueryHuman | String | Human-friendly version of the query, derived from Query. |
| Attributes | String Array | List of attributes appearing in the query |
| AttributeValues | String Array | Partial or full list of attribute values appearing in the query |
| TimeCreated | Date | Time at which query was created |
| TimeModified | Date | Time at which query was last modified |
| TimeLastExecuted | Date | Time at which query was last executed |
| Owner | String | Name of creator, or owner assigned by creator |

In one example embodiment, a user, Jane Doe, creates a search query 206 using query creation tools provided by the metaquery management module 212. The search query 206 created by Jane Doe is "Location="Silver Spring" and Priority>3." Based on the creation of the search query 206, the metaquery management module 212 communicates with the query metadata generation module 214 to generate Table 2, which is the metadata derived by the query metadata generation module 214 based on the search query 206 created by Jane Doe. Some attributes derived by the query metadata generation module 214 are based on system bookkeeping (e.g., "QueryID," "Owner," "TimeCreated," etc.) while others are derived from the search query 206 (e.g., "Attributes," "Attribute Values," etc.). For example, the query metadata attribute "Table" has a value of "assets" which means that the search query 206 generated by Jane Doe is applied to a data set 204 knowns as "assets" and was automatically captured from the user viewing the assets table. The attributes of the "assets" include "Location" and "Priority," which as indicated in the comments of Table 2, were automatically generated from the search query 206 generated by Jane Doe.

TABLE 2

Example Table of Intrinsic Query Metadata

| Query Metadata Attribute | Value | Comment |
|---|---|---|
| QueryID | JaneDoe__0123 | Auto-generated by system |
| Table | assets | Auto-captured from fact that user was viewing the assets table |
| Query | {location: {$eq: "Silver Spring"}, priority: {$gt: 3}} | Auto-captured from user |
| Label | SilverSpring__PriorityHigh | Auto-generated from Query; Could be edited by user |

TABLE 2-continued

Example Table of Intrinsic Query Metadata

| Query Metadata Attribute | Value | Comment |
|---|---|---|
| Description | High-priority assets at Silver Spring location | Auto-generated from Query; Could be edited by user |
| QueryHuman | Location = "Silver Spring" and Priority >3 | Auto-generated from Query |
| Attributes | ["Location", "Priority"] | Auto-generated from Query |
| AttributeValues | ["Silver Spring", "High"] | Auto-generated from Query |
| TimeCreated | 2022-05-04 19:26:00 EDT | Auto-generated by system |
| TimeModified | null | Will be set later, if/when query is modified |
| TimeLastUsed | 22-05-04 19:22:30 EDT | Auto-generated by system |
| Owner | Jane Doe | Auto-generated based on user's ID |

In some embodiments, the query metadata generation module 214 automatically generates the query metadata attributes "Label" and "Description," as shown in Table 2. For example, the "Label" query metadata attribute 208 can be derived from a search query 206 and can be edited by the user. The "Label" query metadata attribute 208 can convey enough information about the search query 206 to help a user grasp what the search query 206 is about without requiring the user to provide or look for a lot of detailed information. For example, the query metadata generation module 214 may receive search queries 206, such as those in Table 3 and generate the corresponding "Label" values. The process for deriving the "Description" query metadata attribute 208 from a search query 206 are similar to that of deriving the "Label" query metadata attribute 208, differing in how the attributes, operators, and attribute values are combined into text.

TABLE 3

Examples of Automatically Generated Labels

| Example Search Query | Derived Label |
|---|---|
| {Location: {$eq: "Silver Spring"}, Priority: {$gt: 3}} | SilverSpring_Priority: High |
| {AssetType: {$eq: "sensor"}, Condition: {$eq: "good"}} | AssetType:Sensor_Condition: Good |
| {Location: {$in: ["Troy", "Yorktown"], AssetType: {$in: ["Blower", "Cooler"]}} | TroyYorktown_AssetType: BlowerCooler |

In some embodiments, the query metadata generation module 214 automatically generates a "QueryHuman" query metadata attribute 208 from a search query 206. The "QueryHuman" query metadata attribute is derived from the search query 206 and is a readily understandable description of the search query 206 for a user who is browsing through a list of search query descriptions. Examples of the "QueryHuman" query metadata attribute 208 derived from a search query 206 by the query metadata generation module 214 is shown in Table 4.

In one example embodiment, the query metadata generation module 214 processes a search query 206 to identify attributes that are categorical and determine to use the categorical value in the derived label. In Table 4, the query metadata generation module 214 determines that in the first example search query 206, the "Location" attribute has categorical values and thus generates "Location="SilverSpring"" as part of the derived label. However, for search query attributes that are not simply categorical values, the query metadata generation module 214 further processes the search query 206 to capture relevant information for the derived label that provides additional information for the user. For example, the search query attribute "Priority: {$gt:3}" is converted to a combination of the search query attribute and an abstraction of the Attribute Value because "High" may be too vague (e.g., there are other attributes that may also have values that abstract to "High."), and thus generates the derived label "Priority>3."

TABLE 4

Examples of Automatically Generated QueryHuman Metadata

| Example Search Query | Derived QueryHuman |
|---|---|
| {Location: {$eq: "Silver Spring"}, Priority: {$gt: 3}} | Location = "Silver Spring" and Priority >3 |
| {AssetType: {$eq: "sensor"}, Condition: {$eq: "good"}} | AssetType = "sensor" and Condition = "good" |
| {Location: {$in: ["Troy", "Yorktown"], AssetType: {$in: ["Blower", "Cooler"]}} | Location is one of "Troy", "Yorktown" and AssetType is one of "Blower", "Cooler" |

In some embodiments, the query metadata generation module 214 automatically generates the "Attributes" and "Attribute Values" query metadata attributes 208 from a search query 206. The "Attributes" query metadata attribute 208 is derived from the search query 206 by listing all the attribute keys of the search query 206. The "Attribute Values" query metadata attribute 208 is derived from the search query 206 by listing all the attribute values for the corresponding attribute keys of the search query 206. Examples of the "Attributes" and "Attribute Values" query metadata attributes 208 derived from a search query 206 by the query metadata generation module 214 is shown in Table 5.

TABLE 5

Examples of Automatically Generated Attributes and Attribute Values

| Search Query | Derived Attributes | Derived Attribute Values |
|---|---|---|
| {Location: {$eq: "Silver Spring"}, Priority: {$gt: 3}} | ["Location", "Priority"] | ["Silver Spring", 3] |
| {AssetType: {$eq: "sensor"}, Condition: {$eq: "good"}} | ["AssetType", "Condition"] | ["sensor", "good"] |
| {Location: {$in: ["Troy", "Yorktown"], AssetType: {$in: ["Blower", "Cooler"]}} | ["Location", "AssetType"] | ["Troy", "Yorktown", "Blower", "Cooler"] |

In some embodiments, the query metadata attributes 208 can include extrinsic query metadata. Extrinsic query metadata can supplement the intrinsic query metadata generated by the query metadata generation module 214. Examples of extrinsic query metadata attributes 208 of a search query 206 are shown in Table 6, such as "ExecutionCount" (e.g., number of times a search query 206 has been executed), "ExecutionFrequency" (e.g., number of times a search query has been executed per time period since its creation), and the like. Extrinsic query metadata attributes can be derived by the query metadata generation module 214 by tracking metrics associated with the execution of a search query 206. By generating intrinsic and extrinsic metadata based on a search query 206, the metaquery management module 212 is able to support metaqueries on query metadata attributes 208 such as "display queries about high-priority assets that have been executed most frequently in the last month", "display search queries that have produced the fewest results", and "display search queries that retrieve the most distinctive words." Thus, metaqueries executed on query metadata attributes 208 can identify potentially matching search queries 206 not only based on the content of the search query 206 but also user interactions with the search query 206, such as how many times the search query 206 was executed or who executed the search query 206.

TABLE 6

Examples of Extrinsic Query Metadata

| Query Metadata Attribute | Type | Description |
|---|---|---|
| ExecutionCount | Number | Number of times query has been executed |
| ExecutionFrequency | Number | Number of times query has been executed per (time period) since its creation. |
| AverageRecordsRetrieved | Number | Average number of records that have been retrieved by executing the query since its creation. |
| SalientWords | String Array | List of most distinctive words relative to a chosen corpus |
| IndicativeNgrams | String Array | List of most distinctive n-grams relative to a chosen corpus |

Figure 3:
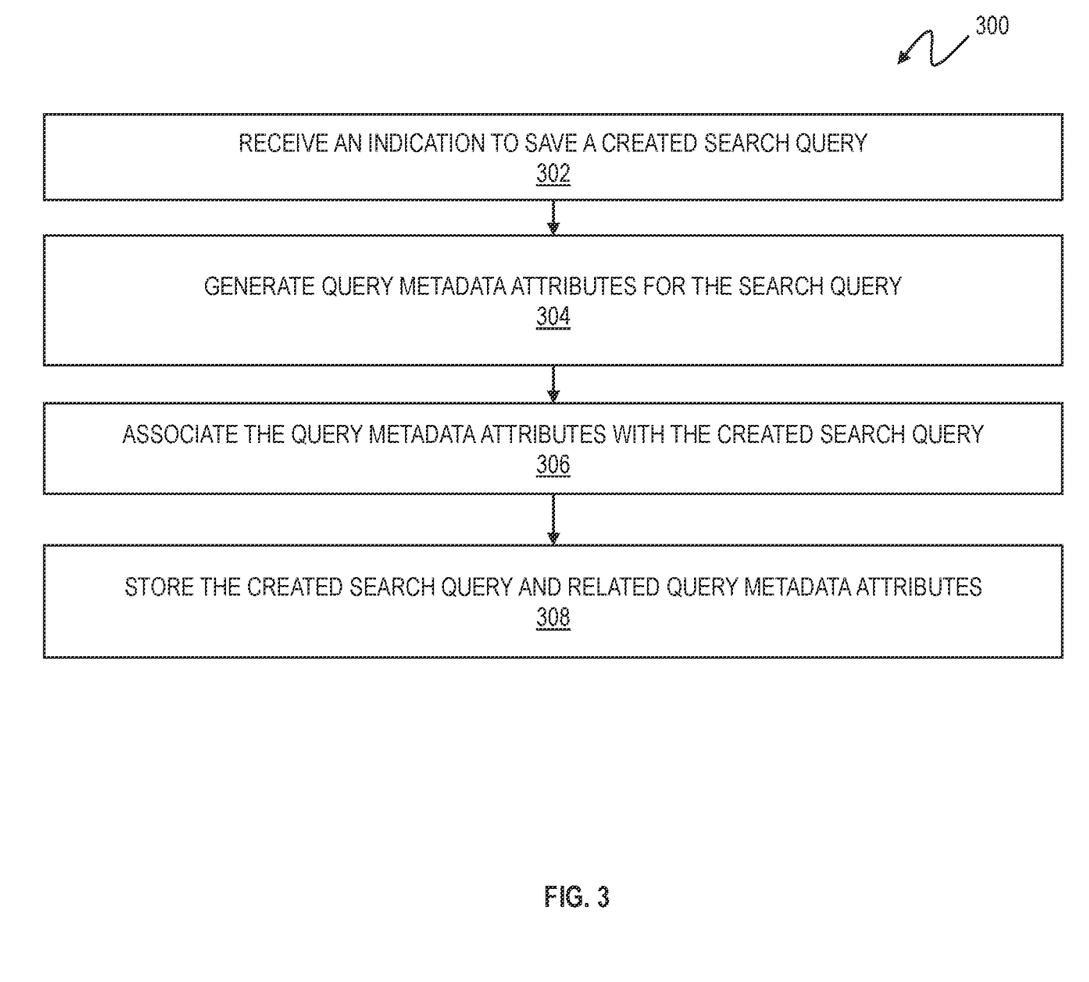
FIG. 3 is a flowchart of a method for creating queries in a system for storing and retrieving queries by content in accordance with one or more embodiments of the present invention.

Referring now to FIG. 3, a flowchart of a method 300 for creating search queries in a system for storing and retrieving queries by content in accordance with one or more embodiments of the present invention is shown. The method 300 begins at block 302 by receiving an indication to save a created search query 206. As discussed above, a user can utilize a user device 210 to create a search query 206 to execute upon one or more data sets 204. The metaquery management module 212 receives an indication from the user device 210 to save a created search query 206. For example, in a premeditated search query 206 creation, the user can create a search query 206 with the intent of using it in the future and indicate a desire to store the search query 206 upon creation. In a reactive search query 206 creation, the user can decide to save a search query 206 after it has been composed and executed.

The method 300 further includes generating query metadata attributes 208 for the search query 206, as shown in block 304. The metaquery management module 212 communicates with the query metadata generation module 214 in response to receiving the indication to save the search query 206. The query metadata generation module 214 generates the query metadata attributes 208 from the search query 206. In some embodiments, the query metadata generation module 214 derives intrinsic metadata from the search query 206 and other system properties (e.g., current time), such as attributes and attribute values from the create search query 206, a time the search query 206 was created and/or modified, and the like. The query metadata generation module 214 also generates extrinsic metadata associated with the search query 206 by tracking and monitoring data in response to the execution of the search query 206. The query metadata generation module 214 prompts the user to provide additional metadata or override descriptive metadata that was derived by the query metadata generation module 214.

Next at block 306, the method includes associating the query metadata attributes 208 with the created search query 206. In some examples, in response to receiving an indication that the user has finished editing the metadata, the query metadata generation module 214 associates the query metadata attributes 208 with the respective search query 206 from which they were derived. In some embodiments, the query metadata generation module 214 generates a link to the search query 206 and stores the link with the query metadata attributes 208, as depicted in block 308 of method 300. In some embodiments, the query metadata generation module 214 stores an identifier associated with the search query 206 with the query metadata attributes 208.

Figure 4:
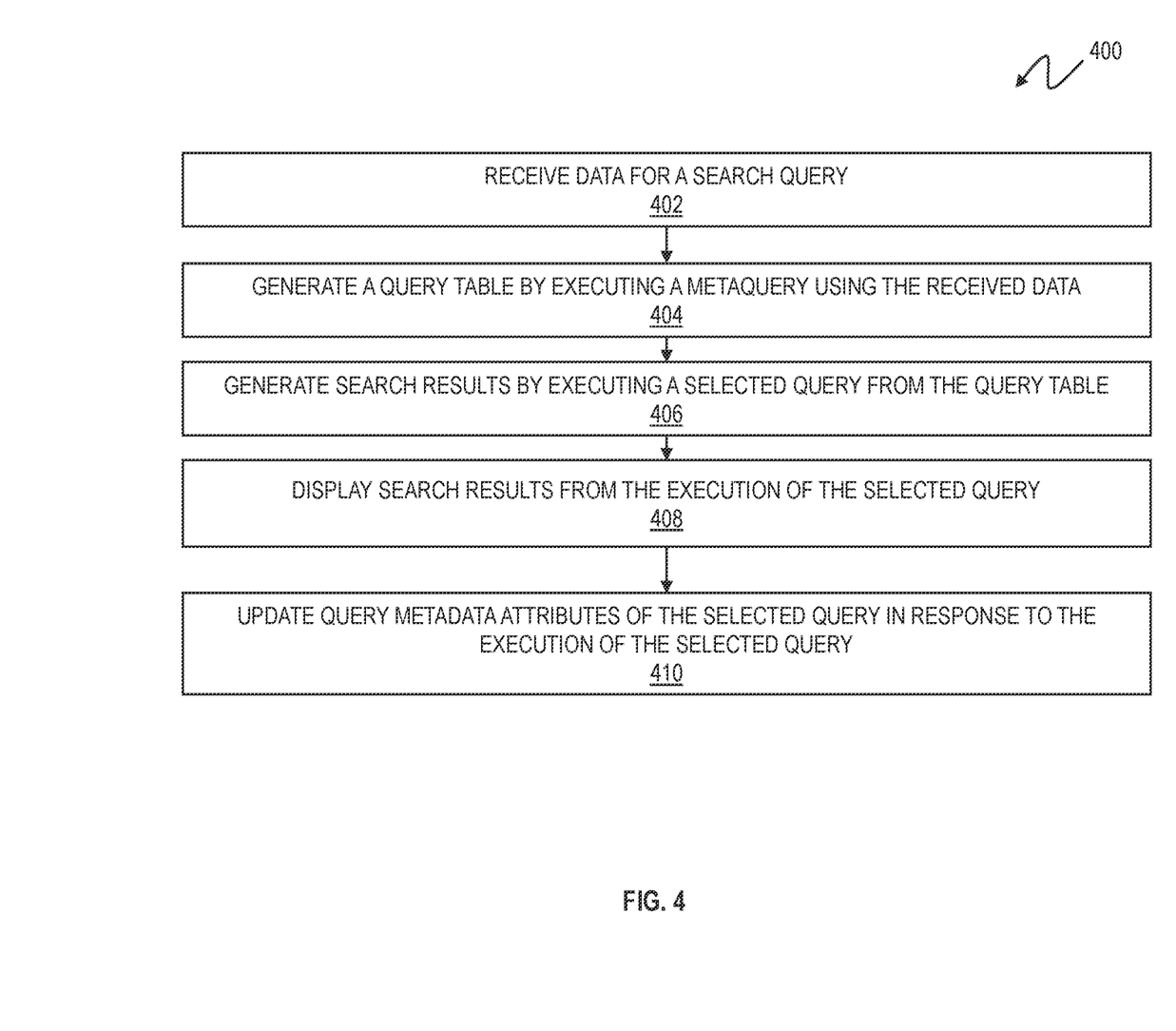
FIG. 4 is a flowchart of a method for retrieving queries in a system for storing and retrieving queries by content in accordance with one or more embodiments of the present invention.

Referring now to FIG. 4, a flowchart of a method 400 for retrieving search queries 206 in a system for storing and retrieving queries by content in accordance with one or more embodiments of the present invention is shown. The method 400 begins at block 402 by receiving data for a search query 206. A user provides data through a user device 210 to identify one or more search queries 206. The data can include, but is not limited to, data about the query, such as one or more attributes or attribute values, when the search query 206 was created, when the search query was last executed, and the like. The metaquery management module 212 receives the data from the user device 210 and executes a metaquery on the query metadata attributes 208 stored by the system using the received data.

The method 400 further includes generating a query table by executing a metaquery using the received data, as shown in block 404. The metaquery management module 212 generates a query table that identifies one or more potentially relevant search queries 206 and displays the relevant query metadata attributes 208 associated with the search queries. In some embodiments, the query table does not display all of the query metadata attributes 208. The query metadata attributes 208 displayed are those deemed most likely to be helpful in locating the desired search query 206 without being overly redundant. If the user Jane Doe wishes to identify search queries 206 she created sometime in May 2022 for which one of the attribute values is "Troy" she could provide the data that indicates the creation date of the search queries is May 2022 and has an attribute value of "Troy." This data could be used to generate a metaquery to execute on the query metadata attributes 208. An example of a query table generated by the metaquery management module 212 for the metaquery executed by Jane Doe is depicted in Table 7.

In some embodiment, the returned search queries 206 displayed in the query table are sorted to place the ones most likely to be deemed relevant at the top of the table (i.e., sorted in descending order of likeliness to be preferred by the user). For example, with regards to Table 7, the metaquery management module 212 can have additional sorting rules to list the results for the metaquery, such as maximizing the number of attributes and attributes values common between the metaquery and the query metadata attributes 208 and minimizing the number of attributes and attribute values of the returned search queries 206 subject to the first criteria. In this example, all three records depicted in Table 7 contain the single Attribute Value "Troy" listed in the metaquery, but the second record has one more Attribute Value than the first, and the third has one more than the second.

TABLE 7

Example Query Table of Results of Metaquery

| QueryID | Table | Attributes | AttributeValues | QueryHuman | TimeCreated |
|---|---|---|---|---|---|
| JaneDoe_0556 | asset | ["Location", "Condition"] | ["Troy", "good"] | Location = "Troy" AND | 2022-05-02 13:30:02 |

TABLE 7-continued

Example Query Table of Results of Metaquery

| QueryID | Table | Attributes | AttributeValues | QueryHuman | TimeCreated |
|---|---|---|---|---|---|
| JaneDoe_0678 | asset | ["AssetType", "Location"] | ["sensor", "Troy", "Yorktown"] | Condition = "good" AssetType = "sensor" AND Location is among "Troy", "Yorktown" | 2022-05-04 19:26:00 |
| JaneDoe_0713 | asset | ["Location", "Priority", "AssetType"] | ["Troy", "Yorktown", "Blower", "Cooler"] | Location is among "Troy", "Yorktown" AND Priority >3 AND AssetType is among "Blower", "Cooler" | 2022-05-22 09:33:55 |

At block 406, search results are generated by executing a selected query from the query table. To further the example of search by Jane Doe, if the search query 206 that Jane is interested in appears among the results of the query table (i.e., Table 7), she could indicate which one she wishes to execute by some means, such as by clicking on it, or typing in or speaking a command to execute that "QueryID." The metaquery management module 212 receives an indication from the user device 210 of Jane Doe of a selection of one of the records displayed in the query table and executes the selected search query 206.

At block 408, the method 400 further includes displaying search results from the execution of the selected query 206. The metaquery management module 212 can facilitate displaying the results from executing the selected search query 206 on the user device 210. The results of the executed search query 206 can be displayed through a user interface on the user device 210 or can be delivered to the user through other means, such as a file download or message containing the results.

At block 410, the query metadata attributes of the selected query are updated in response to the execution of the selected query. Upon executing the selected search query 206, the metaquery management module 212 can communicate with the query metadata generation module 214 to update or augment the query metadata attributes 208 of the search query 206. For example, the query metadata generation module 214 can update information, such as the number of times the search query 206 has been executed, the date of the last execution of the search query 206, and the like. Additionally, if the user executed the search query 206 on an updated or different data set 204, such information is updated by the query metadata generation module 214 in the query metadata attributes 208 for the search query 206.

In some embodiments, after execution of the metaquery, a user can determine that a follow-up query is necessary. There may be too many results that match the user's original metaquery and the metaquery may need to be narrowed further by adding additional clauses to the original search. The user may also determine that although the search query 206 they are looking for is not among the results of the metaquery, upon reviewing the results they may want to modify their search criteria for the metaquery. The user can refine the original search criterion of the metaquery to generate a new set of results of relevant search queries 206. A user may narrow the metaquery by adding or restricting search criteria or broaden the metaquery by removing or revising clauses of the metaquery.

In some embodiments, upon selection of a search query 206 from the query table, the user can choose to modify the search query 206 instead of or prior to executing it. For example, the metaquery management module 212 receives an indication from the user to modify a selected search query 206. The metaquery management module 212 can provide a query edit tool to enable the user to make one or more changes to the search query 206. For example, the user can add, remove, or modify a clause of the selected search query 206. Upon finishing the search query edits, the user can indicate they are finished by clicking on a button or the like. The metaquery management module 212 communicates the edits to the query metadata generation module 214 which can then update the query metadata attributes 208 for the edited search query 206. In some embodiments, the user is given an opportunity to edit the query metadata attributes 208 generated by the query metadata generation module 214. Upon receiving an indication that the user is done with reviewing or editing the query metadata attributes 208, the metaquery management module 212 can store the updated search query 206 and updated query metadata attributes 208 for the search query 206. In some embodiments, the user can initiate execution of the edited search query 206 after the edits and updates have been made and stored to the system.

In some embodiments, multiple users can have access to the search queries 206 and query metadata attributes 208. If a user wishes to modify a search query 206 that has been created by another user or is owned by another user, the metaquery management module 212 can determine if the user has adequate permission to modify search query 206. If so, the metaquery management module 212 can execute the search query 206 and the query metadata attributes 208 are updated accordingly. If the user does not have adequate permission to modify the search query 206, the metaquery management module 212 can ask if the user wishes to make a copy or clone of the search query 206 and can save a copy of the search query 206 for the user with query metadata attributes 208 that reflect that the user is the creator of the copied search query 206. \

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram, or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   receiving data associated with a search query;
   generating a query table by executing a metaquery using the data on query metadata attributes of existing search queries, wherein the query table comprises information for a group of search queries of the existing search queries, wherein the query metadata attributes of existing search queries further comprise intrinsic query metadata and extrinsic query metadata, the intrinsic query metadata being based on intrinsic properties of the existing search queries, and the extrinsic query metadata being derived by tracking metrics associated with the execution of the existing search queries, wherein the extrinsic query metadata comprises a number of executions of the search query;
   determining whether a number of entries in the query table exceeds a threshold;
   responsive to determining that the number of entries in the query table exceeds the threshold, narrowing the metaquery by adding an additional clause to the metaquery to generate a modified metaquery;
   generating search results by executing a selected query from the query table; and
   displaying the search results from the execution of the selected query.

2. The computer-implemented method of claim 1, further comprising:
   updating query metadata attributes of the selected query selected using the search results from executing the selected query.

3. The computer-implemented method of claim 1, further comprising:
   receiving an indication to save a created search query;
   generating query metadata attributes for the created search query;
   associating the query metadata attributes with the created search query; and
   storing the created search query and the query metadata attributes of the created search query.

4. The computer-implemented method of claim 1, wherein the intrinsic query metadata comprises a query attribute name, a query attribute value, or a query attribute type.

5. The computer-implemented method of claim 1, wherein the extrinsic query metadata further comprises at least one selected from the group consisting of a creation date of the search query, a last date of execution of the search query, an average number of records retrieved by the search query, a list of salient words associated with the search query, and a list of distinctive words associated with the search query.

6. The computer-implemented method of claim 1, further comprising:
receiving an indication to modify an identified search query;
modifying an attribute of the identified search query;
updating query metadata attributes of the identified search query in response to modifying the identified search query; and
storing the identified search query and query metadata attributes of the identified search query.

7. A system comprising:
a memory having computer readable instructions; and
one or more processors for executing the computer readable instructions, the computer readable instructions controlling the one or more processors to perform operations comprising:
receiving data associated with a search query;
generating a query table by executing a metaquery using the data on query metadata attributes of existing search queries, wherein the query table comprises information for a group of search queries of the existing search queries, wherein the query metadata attributes of existing search queries further comprise intrinsic query metadata and extrinsic query metadata, the intrinsic query metadata being based on intrinsic properties of the existing search queries, and the extrinsic query metadata being derived by tracking metrics associated with the execution of the existing search queries, wherein the extrinsic query metadata comprises a number of executions of the search query;
determining whether a number of entries in the query table exceeds a threshold;
responsive to determining that the number of entries in the query table exceeds the threshold, narrowing the metaquery by adding an additional clause to the metaquery to generate a modified metaquery;
generating search results by executing a selected query from the query table; and
displaying the search results from the execution of the selected query.

8. The system of claim 7, wherein the operations further comprise updating query metadata attributes of the selected query selected using the search results from executing the selected query.

9. The system of claim 7, wherein the operations further comprise:
receiving an indication to save a created search query;
generating query metadata attributes for the created search query;
associating the query metadata attributes with the created search query; and
storing the created search query and the query metadata attributes of the created search query.

10. The system of claim 7, wherein the intrinsic query metadata comprises a query attribute name, a query attribute value, or a query attribute type.

11. The system of claim 7, wherein the extrinsic query metadata further comprises at least one selected from the group consisting of a creation date of the search query, a last date of execution of the search query, an average number of records retrieved by the search query, a list of salient words associated with the search query, or a list of distinctive words associated with the search query.

12. The system of claim 7, wherein the operations further comprise:
receiving an indication to modify an identified search query;
modifying an attribute of the identified search query;
updating query metadata attributes of the identified search query in response to modifying the identified search query; and
storing the identified search query and query metadata attributes of the identified search query.

13. A computer program product comprising a computer readable storage medium having program instructions embodied therewith, the program instructions executable by a processor to cause the processor to perform operations comprising:
receiving data associated with a search query;
generating a query table by executing a metaquery using the data on query metadata attributes of existing search queries, wherein the query table comprises information for a group of search queries of the existing search queries, wherein the query metadata attributes of existing search queries further comprise intrinsic query metadata and extrinsic query metadata, the intrinsic query metadata being based on intrinsic properties of the existing search queries, and the extrinsic query metadata being derived by tracking metrics associated with the execution of the existing search queries, wherein the extrinsic query metadata comprises a number of executions of the search query;
determining whether a number of entries in the query table exceeds a threshold;
responsive to determining that the number of entries in the query table exceeds the threshold, narrowing the metaquery by adding an additional clause to the metaquery to generate a modified metaquery;
generating search results by executing a selected query from the query table; and
displaying the search results from the execution of the selected query.

14. The computer program product of claim 13, wherein the operations further comprise updating query metadata attributes of the selected query selected using the search results from executing the selected query.

15. The computer program product of claim 13, wherein the operations further comprise:
receiving an indication to save a created search query;
generating query metadata attributes for the created search query;
associating the query metadata attributes with the created search query; and
storing the created search query and the query metadata attributes of the created search query.

16. The computer program product of claim 13, wherein the intrinsic query metadata comprises a query attribute name, a query attribute value, or a query attribute type.

17. The computer program product of claim 13, wherein the extrinsic query metadata further comprises at least one selected from the group consisting of a creation date of the search query, a last date of execution of the search query, an average number of records retrieved by the search query, a list of salient words associated with the search query, or a list of distinctive words associated with the search query.

18. A computer-implemented method comprising:
receiving a request comprising data associated with a search query;
executing a metaquery using the data on query metadata attributes of search existing queries to generate a query table of search queries;
determining whether a number of entries in the query table exceeds a threshold;
responsive to determining that the number of entries in the query table exceeds the threshold, narrowing the metaquery by adding an additional clause to the metaquery to generate a modified metaquery;
executing a selected search query from the query table to generate query search results;
displaying the query search results; and
updating query metadata attributes of the selected search query using the query search results.

19. The computer-implemented method of claim 18, further comprising:
receiving a request to modify the selected search query;
modifying an attribute of the selected search query;
updating query metadata attributes of the selected search query in response to modifying the selected search query; and
storing the selected search query and query metadata attributes of the selected search query.

20. The computer-implemented method of claim 18, further comprising:
receiving an indication to clone the selected search query;
generating a cloned search query and query metadata attributes based on the selected search query; and
storing the cloned search query and the query metadata attributes of the cloned search query.

21. A system comprising:
a memory having computer readable instructions; and
one or more processors for executing the computer readable instructions, the computer readable instructions controlling the one or more processors to perform operations comprising:
receiving a request comprising data associated with a search query;
executing a metaquery using the data on query metadata attributes of search existing queries to generate a query table of search queries;
executing a selected search query from the query table to generate query search results;
determining whether a number of entries in the query table exceeds a threshold;
responsive to determining that the number of entries in the query table exceeds the threshold, narrowing the metaquery by adding an additional clause to the metaquery to generate a modified metaquery;
displaying the query search results; and
updating query metadata attributes of the selected search query using the query search results.

22. The system of claim 21, wherein the operations further comprise:
receiving a request to modify the selected search query;
modifying an attribute of the selected search query;
updating query metadata attributes of the selected search query in response to modifying the selected search query; and
storing the selected search query and query metadata attributes of the selected search query.

\* \* \* \* \*